(12) United States Patent
Choong et al.

(10) Patent No.: US 8,503,330 B1
(45) Date of Patent: Aug. 6, 2013

(54) WIRELESS SYSTEM COMMISSIONING AND OPTIMIZATION

(75) Inventors: Jason Yew Choo Choong, San Jose, CA (US); Peter Graeme Cobb, Wonga Park (AU)

(73) Assignee: Daintree Networks, Pty. Ltd., Scoresby, VIC (AU)

(*) Notice: Subject to any disclaimer, the term of this patent is extended or adjusted under 35 U.S.C. 154(b) by 622 days.

(21) Appl. No.: 12/718,204

(22) Filed: Mar. 5, 2010

(51) Int. Cl.
*H04L 12/28* (2006.01)
*H04W 4/00* (2009.01)
*H04B 7/00* (2006.01)

(52) U.S. Cl.
USPC .................. 370/254; 455/422.1; 455/507

(58) Field of Classification Search
None
See application file for complete search history.

(56) References Cited

U.S. PATENT DOCUMENTS

| | | | | |
|---|---|---|---|---|
| 6,252,858 B1* | 6/2001 | Inoue | | 370/254 |
| 7,623,042 B2 | 11/2009 | Huizenga | | |
| 7,941,136 B2* | 5/2011 | Reed et al. | | 455/424 |
| 7,953,419 B2* | 5/2011 | Jost et al. | | 455/456.1 |
| 8,265,674 B2* | 9/2012 | Choong et al. | | 455/500 |
| 2002/0171379 A1* | 11/2002 | Adamson | | 315/312 |
| 2003/0063585 A1* | 4/2003 | Younis et al. | | 370/331 |
| 2005/0176408 A1* | 8/2005 | Stein | | 455/411 |
| 2006/0215673 A1* | 9/2006 | Olvera-Hernandez | | 370/406 |
| 2008/0130595 A1* | 6/2008 | Abdel-Kader | | 370/338 |
| 2008/0205427 A1* | 8/2008 | Jost et al. | | 370/431 |
| 2008/0218087 A1* | 9/2008 | Crouse et al. | | 315/131 |
| 2008/0242314 A1* | 10/2008 | McFarland | | 455/456.1 |
| 2009/0010178 A1* | 1/2009 | Tekippe | | 370/254 |
| 2009/0045939 A1* | 2/2009 | Holland et al. | | 340/524 |
| 2009/0066473 A1* | 3/2009 | Simons | | 340/3.1 |
| 2009/0080896 A1* | 3/2009 | Pereira et al. | | 398/115 |
| 2009/0267540 A1* | 10/2009 | Chemel et al. | | 315/297 |
| 2010/0180019 A1* | 7/2010 | Elston et al. | | 709/222 |
| 2011/0025469 A1* | 2/2011 | Erdmann et al. | | 340/10.1 |
| 2011/0149803 A1* | 6/2011 | McCormack et al. | | 370/254 |
| 2011/0172844 A1* | 7/2011 | Choong et al. | | 700/295 |
| 2012/0007511 A1* | 1/2012 | Choong et al. | | 315/152 |
| 2012/0082062 A1* | 4/2012 | Mccormack | | 370/254 |

FOREIGN PATENT DOCUMENTS

WO 2006/095317 A1 9/2006

OTHER PUBLICATIONS

"Photosensor Dimming: Solutions." Retrieved from internet http://www.lrc.rpi.edu/researchAreas/reducingBarriers/photosensorSolutions.asp, date unknown, 2 pages.

* cited by examiner

*Primary Examiner* — Marsha D Banks Harold
*Assistant Examiner* — Christopher Wyllie
(74) *Attorney, Agent, or Firm* — Fish & Richardson P.C.

(57) ABSTRACT

Methods, systems, and apparatus, including computer programs encoded on a computer storage medium, for commissioning and optimizing a wireless network. In one aspect, a method includes a wireless network configuration and optimization engine receives configuration data for a wireless network and monitors performance of the wireless network. The engine processes the data to perform on or more automated commissioning operations, and one or more automated optimization operations, thus simplifying commissioning and maintenance of the wireless network.

29 Claims, 7 Drawing Sheets

WIRELESS SYSTEM COMMISSIONING AND OPTIMIZATION

BACKGROUND

This specification relates to commissioning wireless networks and modifying the configuration of wireless networks for improved performance.

Wireless networks are configured according to wireless protocols. Commissioning is the process of setting up a wireless network. In its broadest sense, commissioning covers a wide range of tasks including surveying the radio and physical environment, placement of devices, configuration of parameters, and testing and verification of correct operation. Often, non-technical and semi-technical issues need to be considered when commissioning, including the skills and workflow practices of the installer, the ease and identification and accessibility of devices, the naming conventions of the users, and the interoperability and co-existence with other wireless or wired systems.

Commissioning tools are designed to facilitate commissioning of wireless networks for installers. The commissioning tools typically run on a laptop or handheld device, and provide visualization of the network and devices, and provide options to configure, commission and manage the wireless system.

Commissioning tools typically include a variety of features and functions. The exact requirements for a particular commissioning tool will vary depending on the type of device and application being commissioned, the environment into which it is being deployed, and the wireless protocol standard(s) being used. For example, a commissioning tool typically includes an easy to use interface that hides the complexity of the underlying technology. The commissioning tool may also facilitate start-up commissioning and membership commissioning. Start-up commissioning is used to configure devices with the settings required to join (or start) their intended network, and membership commissioning is used to control which devices are permitted to join a specific network. The commissioning tool may also provide for network and device discovery, which provides information about the existing network, including locations of individual devices, and may further support over-the-air downloads to provide a fast and easy way to update device firmware. For ZigBee wireless networks, the commissioning tool may also support zone commissioning to establish the relationships between devices and their controlling applications, and include support for features that utilize the ZigBee Commissioning Cluster. The features and functions described above are merely examples of the features and functions that a commissioning tool may support, and a particular commissioning tool may support additional functions, or may support fewer functions.

Despite the availability of commissioning tools, the commissioning process is still labor intensive. For example, building plans for a wireless network may require that wireless devices be deployed in many different physical areas of the building, and that the devices be electronically labeled and deployed in zones. However, installers may incorrectly label the device, or fail to label them entirely. Furthermore, the zones may not be associated with each other in a logical manner. Accordingly, after installation and commissioning, a network "snapshot" may reveal a representation that is disorderly from a human perspective. Additionally, network bottlenecks and islands may also be present, resulting in performance degradation.

SUMMARY

This specification describes technologies relating to wireless system commissioning and optimization. In general, one innovative aspect of the subject matter described in this specification can be embodied in methods that include the actions of receiving commissioning data for a wireless network, the commissioning data including: a device list specifying a plurality of wireless devices to join or that have joined the wireless network, and zone configuration data specifying a plurality of zones in the wireless network and further specifying, for each zone, one or more devices of the plurality of wireless devices that belong to the zone; receiving physical environment data defining a plurality of physical deployment areas in which the plurality of wireless devices are deployed; receiving configuration preferences for the wireless network and the physical environment data; automatically generating consolidated zone configuration data from the commissioning data, the physical environment data, and the configuration preferences, the consolidated zone configuration data specifying a plurality of consolidated zones in the wireless network, each of the consolidated zones, corresponding to one of the physical deployment areas and specifying respective one or more wireless devices that belong to the consolidated zone; and commissioning the wireless network according to the consolidated zone configuration data. Additionally, in some implementations, the commissioning can also be based on network segments, and can include re-segmenting networks. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The wireless system commissioning and optimization system provides automation and techniques to reduce the probability installer errors. This reduction, in turn, reduces installation costs by reducing the labor costs required to commission the wireless system.

The wireless system commissioning and optimization system is scalable to handle the commissioning of very large wireless systems (e.g., a wireless control system for an entire building, especially, although not limited to, lighting applications that have one of the largest quantities of controlled devices as a class of devices).

The use of data mining techniques obtain data regarding devices and networks and existing building plans, and the data are processed to simplify the commissioning process and to optimize wireless system operations.

The data can be used for maintenance purposes. For example, configuration and state data of a device is stored in a data store. When the device fails and is replaced, this information can be downloaded into its replacement without requiring any re-commissioning of its replacement.

The data can also be used for auditing purposes, such as collecting an inventory of devices in use, theirs types and their performance, including failure rates, utilization patterns and history of specific devices, types of devices or zones.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

Figure 1:
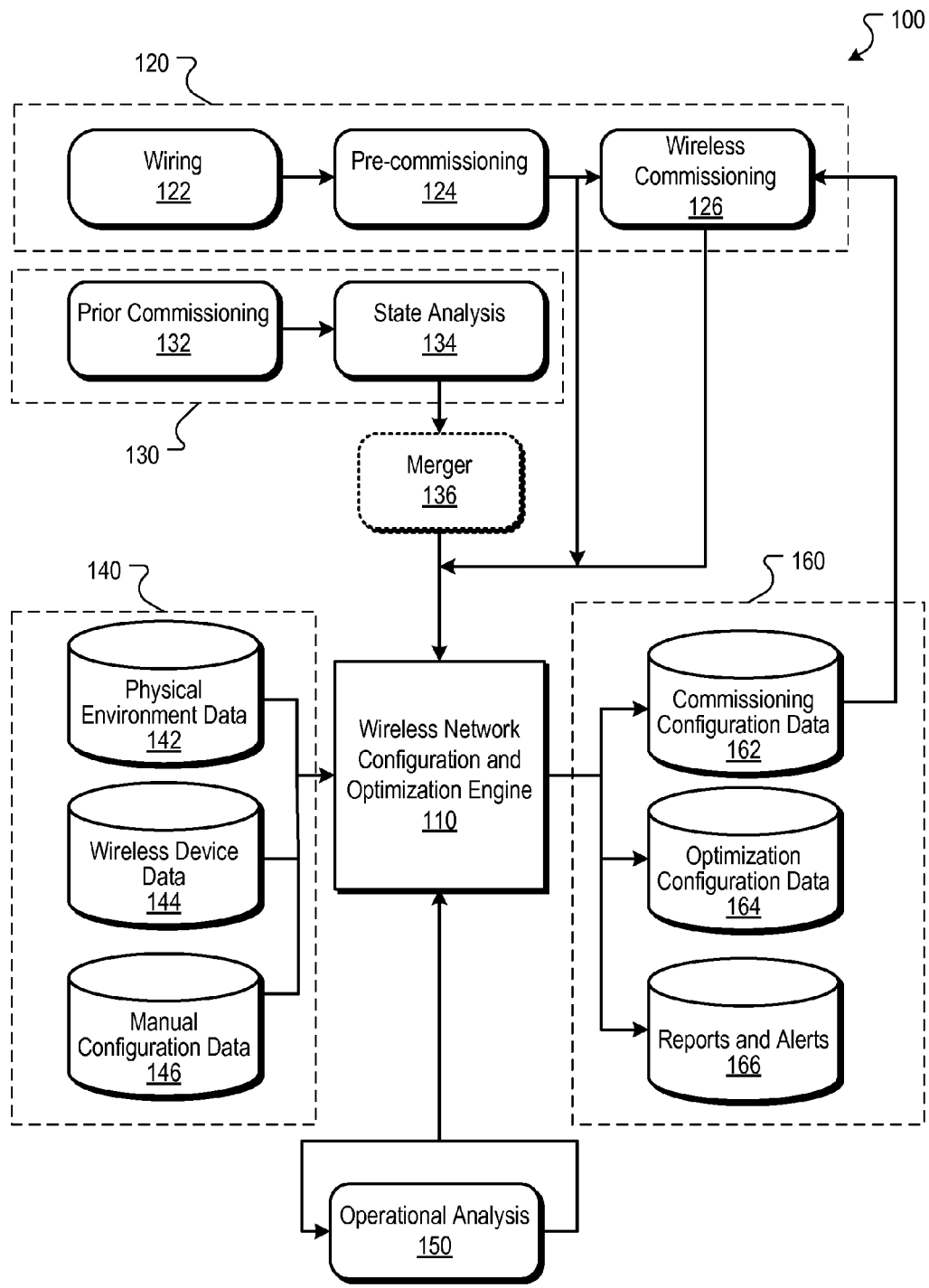
FIG. 1 is a block diagram illustrating processes and data associated with a wireless network configuration and optimization engine.

FIG. 1 is a block diagram illustrating processes and data associated with a wireless network configuration and optimization engine 110. The engine 110 receives data from multiple sources, including commissioning processes 120 and 130, system configuration data 140, and from an operational analysis 150. The engine 110 can trigger one or more actions, such as zone assignments, segmenting or joining networks, and take other commissioning actions. The engine 110 generates output data 160, including commissioning configuration data 162, optimization configuration data 164, and reports and alerts 166. The commissioning configuration data 162 and the optimization configuration data 164 can be stored in the wireless device data 144. Each of these data sources and how the engine 110 utilizes the data are described below.

In some implementations, the engine 110 is implemented in a commissioning tool that is used to commission a wireless network. In other implementations, the engine 110 is implemented as an application that is separate from the commissioning tool, e.g., an application that is invoked after an initial commissioning of a wireless network. The commissioning tool is typically implemented in a laptop computer or some other form of a portable computing device with a wireless radio transceiver.

For the purposes of illustration only, the engine 110 is described in the context of commissioning and optimizing wireless network that conforms to the ZigBee specification. The ZigBee specification, published by the ZigBee Alliance, is based on the IEEE 802.15.4 standard. The IEEE 802.15.4 standard is a standard for low-rate wireless personal area networks (LR-WPANs). The ZigBee specification defines a suite of high level communication protocols that use low-power and low-bandwidth digital radios. The low power consumption and low bandwidth requirements of a ZigBee device reduces cost and prolongs battery life, and thus such devices are often used for sensors, monitors and controls. The engine 110 and its associated functions and capabilities, however, can be used for other types of wireless networks as well.

Figure 2:
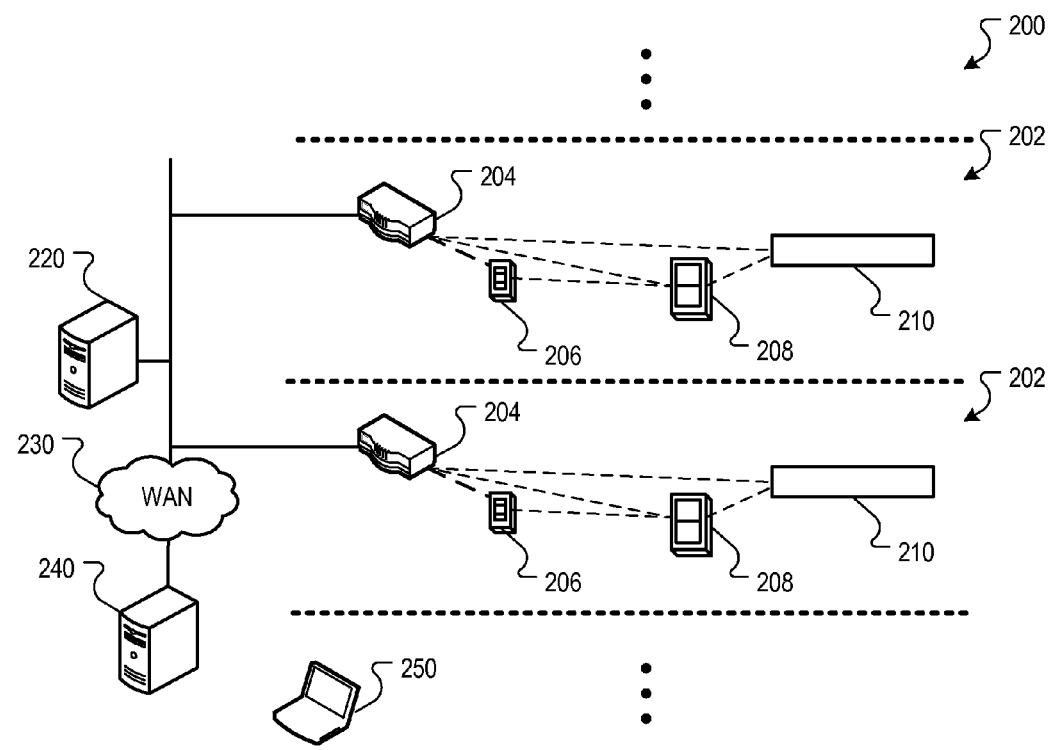
FIG. 2 is a block diagram of a control system in a building.

FIG. 2 is a block diagram of a control system 200 in a building, and illustrates an example environment in which the engine 110 is used. The control system 200 can use any one of many appropriate wireless network protocols, and for illustrative purposes only, the system 200 is described in the context of the ZigBee wireless networking standard. The system 200 is implemented in multiple floors 202 in the building, of which only two floors are shown. For purposes of illustration only, only the wireless lighting control portion of the system is shown; however, many other control features can also be implemented, e.g., heating and air conditioning controls, for example.

The control system 200 includes, for each floor 202, a gateway controller 204, a wireless sensor 206, a wireless switch 208, and a wireless adapter 210. The gateway controller 204 can, for example, be a lighting controller that also provides gateway functionality, i.e., converts wireless communications to communications that conform to another transport technology, typically TCP/IP-based such as Ethernet, LONTalk or ModBus, for example. For convenience, a gateway controller 204 is illustrated on each floor; however, a gateway controller can receive and process data for multiple floors. In general, a network segment can straddle multiple floors, and/or a floor may have multiple segments.

The wireless sensor 206 can be a wireless device that provides sensor functionality, such as a motion sensor and/or a photo sensor. The wireless switch 208 controls the state of the wireless adapter 210. The wireless switch 208 can be an on/off switch, or a dimmer.

The wireless adapter 210 can be used in connection with a power supply (such as a fluorescent ballast or LED driver). The wireless adapter 210 incorporates a wireless radio and is controlled by one or more of the gateway controller 204, wireless sensor 206 and wireless switch 208. The wireless adapter 210 can, in some implementations, be integrated into the power supply; in other implementations, the wireless adapter can be connected to the power supply. This latter implementation is suited for back fitting existing wired power supplies. For convenience, the term "wireless adapter" will be understood to apply to either configuration. To avoid drawing congestion, the wireless adapter and the ballast are shown as a single entity.

Each of the devices can communicate by radio transmissions, as indicated by the dashed communication paths. A server 220 can communicate with each of the gateway controllers 204 by an Ethernet connection, for example. The server 220 runs a lighting control application that provides the coordination function for gateway controllers 204. The lighting control application ensures that the devices managed by multiple gateway controllers 204 are processed as single entities. The lighting control application also provides account management, system-wide diagnostic and energy management functions. The lighting control application can, in some configurations, be run on a remote server 240 that is in data communication with the control system 200 over a Wide Area Network 230, such as the Internet.

A laptop 250, which includes a wireless transceiver, runs a commissioning tool. The commissioning tool is typically software that facilitates wireless commissioning. The laptop 250 is typically brought on-site for commissioning (or re-commissioning) purposes, and then removed from the site.

In the implementations in which the engine 110 is implemented in a commissioning tool that is used to commission a wireless network, the engine is implemented on the laptop. In the other implementations in which the engine 110 is implemented as an application that is separate from the commissioning tool, the engine 110 can be implemented in the lighting control application or as a separate application on one or more of the servers 220 or 240.

§2.0 Data Collection and Mining

For initial data collection, the engine 110 receives commissioning data from one of the commissioning processes 120 or 130, receives system configuration data 140 from one or more data stores, and receives operational analysis data from an operational analysis process 150. The system configuration data includes physical environment data 142, wireless device data 144, and manual configuration data 146. In some implementations, the system configuration data 140 includes data generated from the commissioning processes 120 and/or 130.

§2.1 Commissioning

In FIG. 1, two types of commissioning are shown—new system commissioning 120, and prior system commissioning 130. New system commissioning 120 is described in section 2.1.1 below, and prior system commissioning 130 is described in section 2.1.2 below. The majority of the data collected by either approach commissioning is similar, except that in the case of new system commissioning, the data is being gathered as the system is being commissioned, while in the case of prior system commissioning, the data is gathered by an analysis of the existing system.

§2.1.1 New System Commissioning

The first process in commissioning a new system is a wiring process 122 to provide the appropriate wiring required. Standard electrical wiring (120V, 240V, 277V, 480V, etc.) is installed. In building installations, electricians work from detailed plans, e.g., the physical environment data 142, which includes building plans. These plans define what equipment needs to be installed and where it is placed.

The wiring process 122 typically requires that the actual physical devices that are deployed be appropriately labeled. For example, the plan may specify that an occupancy sensor (product number 12345) be placed in the north-west corner on the fifth floor, e.g., room 5-25. When the electrician places a specific device in that location, and records the IEEE address of the device placed in that location, e.g., by means of a barcode sticker that can be removed from the device and placed on a plan hard copy and later scanned by a commissioning agent, or, alternatively, scanned by the electrician during installation. Alternatively, a globally unique device identifier may be provided through non-electronic or electronic means (such as a label on a plan hard copy, a barcode can be uniquely associated with the device identifier, an electronic import of a building plan with a proposed device layout, etc.).

The next process in commissioning a new system is a pre-commissioning process 122. After the electrical wiring is complete, a commissioning agent carries out an initial configuration of the system, prior to commissioning the devices onto the system. The pre-commissioning 124 includes entering the physical identifiers of the deployed devices into a data store, which is accessible by the engine 110. The data entered into the data store can include a list of expected devices that are to join the wireless network. Additionally, the commissioning agent can perform initial configuration of system devices such as controllers and gateways.

The commissioning agent may also provide zone configuration data specifying zones in the wireless network and further specifying, for each zone, one or more of the devices that belong to the zone. As used herein, a "zone" represents a logical grouping of wireless devices that facilitates control of the devices as a single entity. For example, a group of devices can be associated with a group address that is unique to a particular zone. The zone configuration data can also include zone labels (e.g., zone names according to a zone labeling scheme, bindings, and/or device labels.

The wireless commissioning process 126 is then performed. In the implementations in which the engine 110 is implemented in a commissioning tool, the process 126 utilizes the data gathered from the pre-commissioning process and other data sources, and configures the wireless system with consolidated zones and optimizes the configuration. In the implementations in which the engine is implemented as an application that is separate from the commissioning tool, the commissioning tool commissions the wireless network, and afterwards the engine 110 performs post-commissioning processes to configure the wireless system with consolidated zones and optimizes the configuration.

The wireless commissioning process 126 includes bringing wireless devices onto the operating network and ensuring that the correct devices are on the network and are configured appropriately. In some implementations, the wireless commissioning 126 is processed using a commissioning tool that implements the engine 110. The commissioning tool is used to start a network (e.g., define a particular channel and, optionally, security parameters) and allows the wireless devices to join the network. The commissioning tool also generates a list of actual devices that are detected to join the network, and cross-references the list against a list of devices obtained from the pre-commissioning process to detect potential or actual faults, such as inoperable devices, incorrectly identified devices, etc. The differences between these two lists may be used to flag either missing devices and/or unexpected devices for processing by the engine 110.

Zones for devices can also be defined during this process. For ZigBee devices, the commissioning tool utilizes a commissioning cluster to establish a commissioning network. The wireless devices join the commissioning network to receive commissioned data for an operational network (or an operational network to be implemented). The device is then reset with the commissioned data and joins the operational network as a new node.

As described above, the data gathered during the wiring process 122, pre-commissioning process 124 and wireless commissioning process 126 can be used to facilitate wireless commissioning in conjunction with the engine 110 (either as implemented in the commissioning tool or interfacing with the commissioning tool by use of, for example, an appropriate API). The data gathered during these processes can be stored in the system configuration data 140.

§2.1.2 Prior System Commissioning

In some situations, a wireless system may have been previously commissioned, and the engine 110 can be used to further configure and/or optimize the previously commissioned wireless system. The prior commissioning process 132 occurs during a previous deployment of a wireless system. In the previous deployment of the wireless systems, parts of the overall system may already have been commissioned or in an unplanned (or semi-planned) manner. For example, parts of the overall system may have been commissioned according to a plan that specifies commissioning individual rooms or zones first, verifying correct operation within the rooms/zones, and then later merged together. Likewise, different types of functional groups of devices may have been deployed separately (e.g., such as devices for lighting control, followed by devices for heating and air conditioning), and then later merged.

Conversely, after the wireless system is commissioned, additional devices may be commissioned at a later time and without full consideration of the prior commissioning requirements. For example, wireless devices may be deployed within a part of a building during initial construction, and then months later, additional devices may be deployed.

The state analysis process 134 provides a "snapshot analysis" of the currently commissioned wireless system. The commissioning tool (or other software, such as a wireless network analyzer) can analyze the state of a commissioned system and provide data describing the current wireless system state to the analyzer 110. For example, if the prior commissioning 132 created multiple, independent rooms the state analysis process 134 will generate data describing previously created zone or group assignments (if any); device bindings; device type and/or labels, other device-specific information, such as electricity consumption specifications, or any special flags or settings that are used for commissioning or optimization purposes. The data gathered during these processes can be stored in the system configuration data 140.

In the event that several different wireless network segments exist (i.e., where a wireless network segment contains a subset of devices from the overall system which operate on the same wireless network and can communicate wirelessly to each other, but are unable to communicate wirelessly to devices on other wireless network segment), and the different wireless network segments are to be processed as a single wireless network by the engine 110, an optional merger process 136 can be performed to bring devices onto a single system. Merger may not result in a single wireless network segment, as the purpose of merging is to bring the devices under the control of the overall system. If there few enough devices that are being merged into the single system, then they could be merged into one wireless network segment. However, if there are too many devices to merge into a segment, then they are broken up into multiple wireless network segments (as part of the 136 merger process, or possibly some iteration of 136 to 110 to 126). In the case of multiple segments, each segment is managed by a gateway 204, but the gateways are integrated together a collective system by 220/240 operating in conjunction with the gateways 204.

For example, the prior commissioning process 132 may have commissioned by aggregation, i.e., the process 132 may have commissioned the entire system in small groups. For example, the installer may deploy systems on a room-by-room basis, in which the devices in each room constitute a complete self-standing subsystem. Likewise, in a retail setting, the installer may deploy lights by aisles (deploying whole rows of lights), or perhaps by areas (such as the checkout area). The installer could do so by using a commissioning tool that starts a wireless network and allows all lights in the aisle or area to join by sequentially turning on individual electrical circuits, commissioning them and then moving on to the next aisle or area, and continuing the process with the next electrical circuit. In some implementations, the commissioning tool will normally start a temporary wireless network for the purpose of commissioning, then send devices to the operating network segment that was started by a gateway.

The data from the state analysis process 134 and the optional merger process 136 are provided to the engine 110. For example, a commissioning tool implemented on a laptop device that was used for the state analysis process 134 and the optional merger process 136 can provide the data to the engine 110.

§2.1.3 Input Data for the Wireless Network Configuration and Optimization Engine The engine 110 receives commissioning data for a wireless network from the commissioning processes 120 and/or 130. The commissioning data includes a device list specifying the wireless devices to join or that have joined the wireless network, and zone configuration data specifying zones in the wireless network and further specifying, for each zone, one or more of the devices that belong to the zone.

The device list is stored in the wireless device data 144. The device list can be in one or two forms—an expected device list obtained through physical identification of all devices installed during the wiring process 122, and an actual device list obtained from the wireless commissioning process 126 or the state analysis process 134.

The device list can specify additional data about each device, such as bindings, labels, location, device type, and device specific information. In the context of ZigBee devices, the bindings specify connections between two endpoints, one on the source device and the other on the destination device (if unicast is used), or an endpoint from the source device to endpoints on multiple destination devices (if group multicast is used), with each supporting a specific application profile and message type. Each message type is represented by a cluster within that profile. In some implementation, the engine 110 attributes a higher likelihood that devices that are bound to each other, especially on a one-to-one basis, are more likely to be closer to each other (e.g., a sensor to a ballast, a thermostat to a vent or chiller). Conversely, a device bound to many other devices may not provide as accurate an indication of proximity (e.g., an occupancy sensor triggering many ballasts in a large room).

Devices commissioned within an office room, aisle or area, may also be labeled to be similar to other devices in that subsystem. For example, if an office room is named "Meeting Room 2C", the lights within this subsystem may be labeled "Meeting Room 2C—Light 01", "Meeting Room 2C—Light 02", and so forth; the wall controller, "Meeting Room 2C—Wall Controller"; and the occupancy sensor "Meeting Room 2C—Occupancy Sensor".

The device type and other device specific information can specify the type of device, e.g., thermostat, light switch, etc., and device specification information, e.g., wattage load on a lamp, lamp type and lamp model, foot-candle sensitivity of photosensors, etc.

In some implementation, this information can be stored in a database in the wireless device data 144 and cross-referenced with the device identifier before install or during installation.

The physical environment data 142 defines physical deployment areas in which the wireless devices are deployed. The physical environment data 142 may include floor plans, CAD drawings, information on device locations, labels, device specifications (such as the wattage of lamps to be used at specific locations) and manifests (lists of devices expected in the system).

The manual configuration data 146 stores data specifying manual user configurations of the wireless system. Manual configurations can also specify settings for the engine 110, such as defining which processes in the engine to enable/disable (e.g., zone consolidation algorithms, labeling algorithms, segmenting algorithms, which are describe below), process controls, etc. For example, the manual configuration data can define areas on floor plans for specific zones, i.e., maps zones to specific areas on the floor plan, auto-labeling zones or devices, allowing or restricting modifications of zone membership for devices, application-specific rules (e.g., turn all lights off at 10 PM, except for emergency lights, calibrating photosensors, etc.); and allowing or restricting re-segmenting triggers and re-segmenting operations. The use of the manual configuration data 146 by the engine 110 is described in more detail below.

§2.2 Operational Analysis

The operational analysis process 150 detects potential and actual problems in a live operating network. Although shown as a process separate from the engine 110, the operational analysis process 150 can, in some implementations, be implemented in the engine 110. In other implementations, the operational analysis process 150 can be implemented in a separate program that has access to the system configuration data 140 and receives network traffic data. For example, a network analyzer system, which can include multiple network traffic sensors distributed throughout a building, or can monitor traffic by receiving traffic data from wireless devices, can be used to perform the operational analysis process 150.

The operational analysis process 150 can detect and generate a variety of potential and actual system problems, such as unresponsive or failed devices, increases in retransmission or packet losses, increases in end-to-end latency, hop counts in a traffic path to detect whether too many hops are taken to transmit packets between devices, increases in detected interference and ambient noise, isolated devices, overloaded routers, security intrusion, etc.

Unresponsive or failed devices are detected when an expected or previously identified device fails to respond to communications requiring a response from the device. Increases in retransmission or packet losses are detected when such increases exceed a threshold amount relative to a baseline amount, e.g., a 10% increase in retransmissions may be considered an increase, while a 5% increase may not. Increases in end-to-end latency are detected when such increases exceed a threshold amount relative to a baseline amount, e.g., a 10% increase in packet transmission time between two end points may be considered an increase, while a 5% increase may not. Likewise, increases in detected interference and ambient noise are detected when such increases exceed a threshold amount relative to a baseline amount, e.g., a 1 dB increase in detected energy may be considered an increase, while a 0.5 dB increase may not.

Detecting whether too many hops are taken can involve determining whether a number of hops exceeds a threshold number, e.g., the operational analysis process 150 may be configured with a threshold number of four hops. Any transmission that requires more than four hops may be considered a transmission that requires an excessive number of hops.

A device is determined to be isolated if the device cannot establish at least a minimum quality data communication with a threshold number of wireless router devices. A minimum quality data communication is a data communication that does not experience system problems monitored by the operational analysis process 150. For example, a device that is in data communication with only two wireless routers is determined to be an isolated device. Likewise, a device that does not meet a hop count requirement (e.g., within a minimum number of hops for a minimum number of wireless routers) routers is also considered an isolated wireless device.

Other criteria for determining whether a device is an isolated device can also be used. For example, devices that form "radio islands," i.e., collections devices on the same wireless network that have good connectivity to many other devices, but each collection of such devices are isolated from other collection and there are no routing options for routing between them, can be considered isolated devices.

The operational analysis process 150 can also monitor for additional system problems, such as overloaded routers, where traffic loading on specific routers far exceed other routers, possibly creating bottlenecks; security intrusion, such as detection of repeated attempts at joining the system; address spoofing, etc.

The operational analysis process 150 can be implemented as an ongoing task. The engine 110 can be configured to collect and process data described above in continuous or periodic manner. In some implementations, the operational analysis process 150 is implemented as background task that does not substantially interfere with normal operation of the wireless network.

§3.0 Configuration and Optimization

The engine 110 receives the data described above and can configure the wireless system for additional commissioning and/or optimization purposes. As used herein, the term "optimization" refers to the altering of system settings and configurations to achieve a performance improvement, as measured by one or more metrics, relative to the performance of the system as measured by the same one or more metrics prior to the optimization. The optimization may result in an incremental performance improvement, and need not result in a theoretical "best" performance, nor a practical realization of a best performance.

§3.1 Configurations

The engine 110 can perform a variety of configuration actions. These actions can be taken during initial commissioning, and can also be taken after initial commissioning (e.g., re-commissioning an existing system, when performing system maintenance, when a device fails, or when additional devices or segments are added to the wireless system).

§3.1.1 Zone Consolidation

Zones are typically combinations of groups of devices that are intended to operate together, and provide effective handles for the purpose of commissioning and configuring the system. More specifically, zones are logical groupings of devices that allow a system to control the devices as a single entity. In other words, zones are a virtual bundling together devices that are always controlled together to facilitate a controlling of devices that are always controlled together.

How zones are implemented can depend, in part, on the wireless communication protocol. In general, a zone can be implemented as a data abstraction on top of the particular addressing and grouping scheme required by a particular wireless protocol. A zone can include multiple group addresses and/or multiple unicast addresses for the zone, and which are unique to the zone. Alternatively, a zone can be mapped to multiple different group addresses, and communications to and from each group address can be controlled according to the zone mapping. Alternatively or additionally, each device in a zone can be individually addressed and mapped to the zone.

An example zone implementation in a ZigBee based system is described with reference to 3A, which shows example zone configurations for devices. In FIG. 3A, Zone 330 includes the adapters 210-A, 210-B, the sensor 206, and the switch 208. Zone 340 includes the adapter 210-B and the switch 208. Finally, zone 350 includes all the devices in zones 330 and 340.

The ZigBee devices communicate by way of output clusters and input clusters. For the purposes of illustrating the realization of zones, only a subset of the clusters are described. In particular, the wall switch 208 has two output clusters—one for Group A (group address A), and one for Group B (group address B), and an input cluster. Each of the adapters 210-A have an input cluster for Group A, and the adapter 210-B has an input cluster for Group B.

In ZigBee groups define a way of communicating to many devices from a source to a destination. Where the control is intended to originate from the wall switch 208 directly to the adapters 210, ZigBee's way of doing this is to have a binding from the output cluster on one endpoint of the wall switch to the group it wants to communicate to and the corresponding wireless ballast adapters have input clusters on an endpoint that belong to the same group (i.e., Groups A and B).

On a similar basis, if the sensor 206 is to send control message directly to these devices, it too can have a binding to the Group A and Group B devices. However, the sensor need not have an output cluster to either Group A or B to be a member of zones 330 and 340, respectively. Instead, the sensor 206 can be configured to send a unicast message directly to the gateway controller 204. For example, if the sensor 206 needs to communicate with the adapters 210-A in zone 330, the sensor 206 sends a unicast message 360 to the gateway controller 204. The gateway controller 204 stores a mapping of the sensor 206 and the adapters 210-A to the zone 330, and thus sends the message 360 to the adapters 210-A. In this way, the sensor 206 need not have any bindings to the other devices in the zone 330. Prior to sending the message 360 to the adapter 210-A, the gateway controller 204 may process the information contained within the message 360 it received from sensor 206, and take appropriate actions, including determination of the content of the message 360 from the gateway controller 204 to the adapter 210-A, or even not sending the message 360 from the gateway controller 204 to the adapters 210-A. Furthermore, the gateway need not be considered as part of the zone 330, as it is effectively acting as a proxy for the sensor 206.

Likewise, the wall switch 208 can be configured to send unicast messages to devices in groups A and/or B. Additionally, the gateway 204 could also be configured to send messages to the devices in groups A and/or B.

With respect to zone 350, the gateway 204 can store a mapping of groups A and B to zone 350. Accordingly, the gateway 204 can send a message to each of these two groups on two bindings so that the message is destined for Groups A and B. Another option is for the gateway 204 to communicate a message, e.g., message 362, through the wall switch 208, which is in control of the adapters 210-A and 210-B. These mappings also apply irrespective of whether there is a single wall switch 208 that is a member of Group A and Group B, as shown in FIG. 3A, or if there are separate wall switches for each of Groups A and B, or if there is no wall switch and one wall switch for each of Groups A and B respectively (or vice-versa).

Figure 3B:
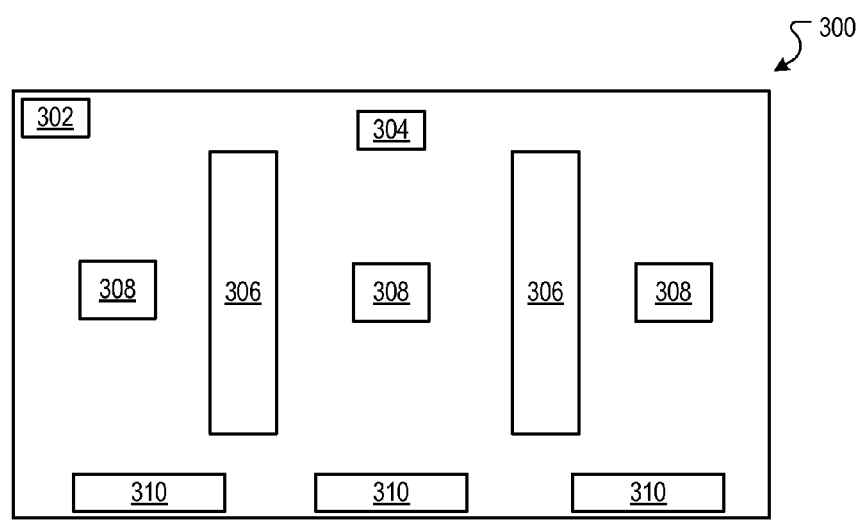
FIG. 3B is a block diagram of lighting controls used in a meeting room in the building and which belong to several zones.
Figure 3A:
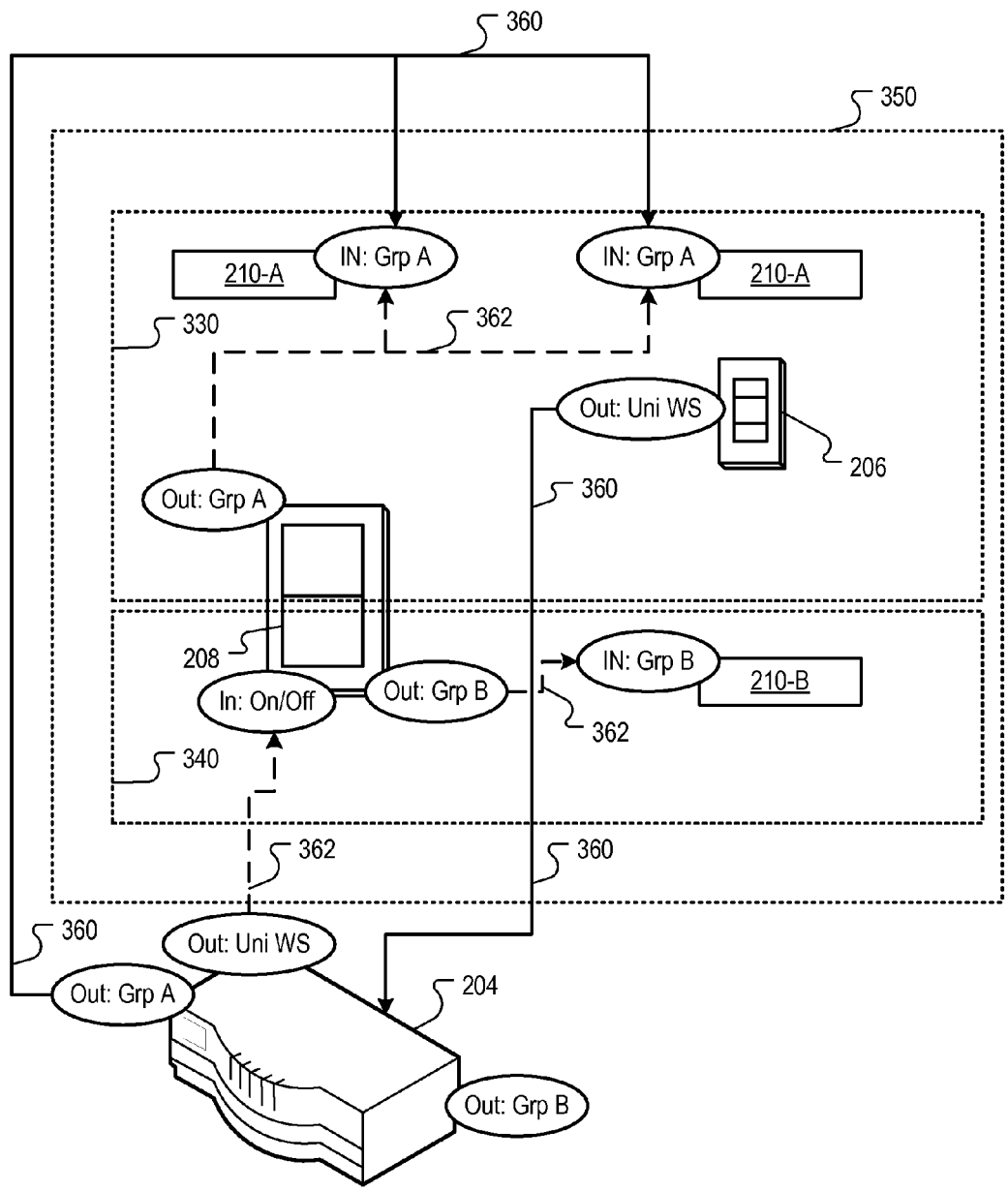
FIG. 3A is a block diagram illustration of zone configurations for devices.

FIG. 3B is a block diagram of lighting controls used in a meeting room 300 in a building and which belong to several zones. The room 300 includes fluorescent light fixtures 306 that provide the main lighting, a set of warm halogen lights 308 set further back from the projector screen to be used when the projector is used, LED accent lights 310 set against the wall for effect, and one occupancy sensor 302 and one photo sensor 304 to provide sensor control. An example zone structure for the devices in the room can be three zones—Main, Projector, and Accent. The fluorescent light fixtures belong to the zone Main, the halogen lights 308 belong to the zone Projector, and the LED accent lights 310 belong to the zone Accent. Additionally, the occupancy sensor 302 belongs to all zones, and the photo sensor 304 belongs to the zones Main and Projector.

The zone configuration data specifying the zones and the devices belonging to the zones may, for example, been obtained from either of the new system commissioning 120 or and prior system commissioning 130.

The physical environment data 142, which defines the physical deployment area of the room, include the following information: Type: Meeting Room; Name: Aristotle; Id: 6-25; Location: NW Corner Floor 6.

Various zone configurations can be configured for other rooms as well. Similarly, other zone configurations could extend to two or more rooms, or even entire floors. For example, a zone "Emergency" can define that all emergency lights deployed on a floor belong to the zone.

However, the physical environment data 142 and the zone configuration data for multiple zones may not be logically associated. For example, the zone configuration data may not be associated in a hierarchal manner, making it difficult for a user to examine the zone data in a logical manner. Likewise, the zone configuration data may not be associated with the physical environment data 142, making it difficult for a user to determine which zones and which physical deployment areas are associated.

In some implementations, the engine 110 can process the zone configuration data and the physical environment data 142 to generate consolidated zone configuration data that specifies consolidated zones in the wireless network. Each of the consolidated zones corresponds to one of the physical deployment areas, and specifies respective one or more wireless devices that belong to the consolidated zone. The engine 110 can then, either by itself or in conjunction with a commissioning tool, commissions the wireless network according to the consolidated zone configuration data.

Figure 4:
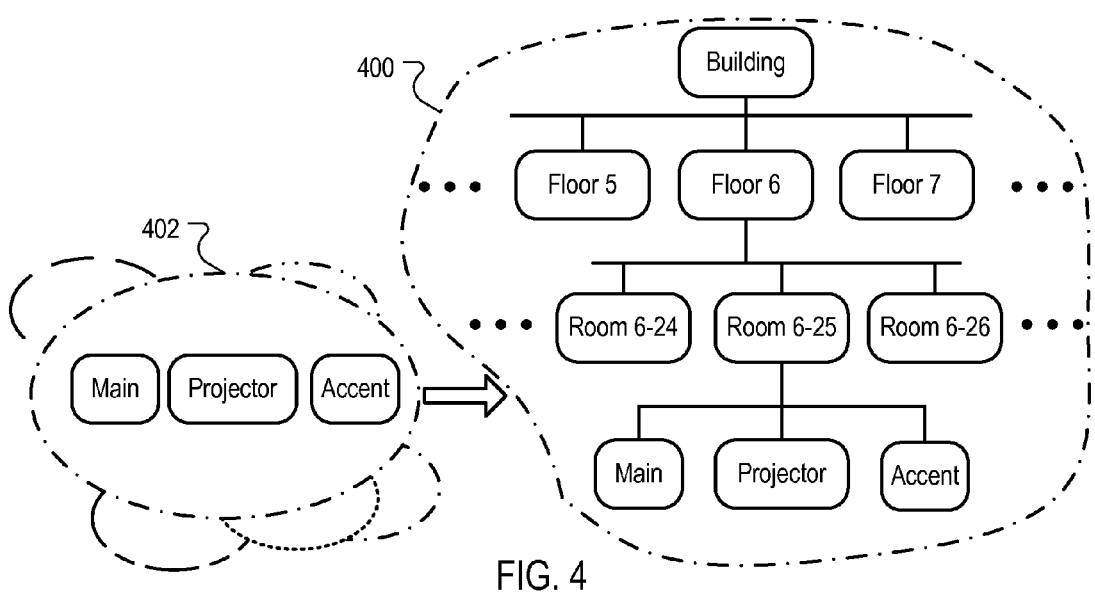
FIG. 4 is a block diagram illustrating the generating of consolidated zones.

FIG. 4 is a block diagram illustrating the generating of consolidated zones 400. The zones 402 are for the meeting room described above, and include the zones Main, Projector, and Accent. The zones 402 are representative of many other zone configurations throughout the building. The engine 110 processes the zone configuration data and the physical environment data 142 to generate consolidated zone configuration data that specifies consolidated zones 400 in the wireless network. For example, the physical environmental data 142 may define a physical deployment area hierarchy that includes physical deployment area parent nodes and physical deployment area child nodes, each of which represent one of the physical deployment areas (e.g., a room, a collection of rooms, a floor, an aisle, etc.). Using this hierarchy, the engine 110 accesses the wireless device data 144 to determine which zones are associated with each physical deployment area. Based on the determination, the engine 110 creates a zone hierarchy that includes parent area zone nodes and child area zone nodes.

For example, the nodes Building, Floor 6, Room 6-25 are each parent area zone nodes; likewise, the nodes Floor 6 and Room 6-25 are also child area zone nodes. Each node represent at least one of the consolidated zones, each node also corresponds to one of the physical deployment area parent nodes or physical deployment area child nodes. For example, the zone nodes Room 6-25, Main, Projector and Accent correspond to the physical deployment area child node that identifies the Room 6-25 in the physical environmental data 144. Thus the physical deployment area hierarchy is mapped to the zone hierarchy.

Some of the zones can also be created by the engine 110 during the generation of the consolidated zones. For example, the node Room 6-25 may also represent a zone that includes the zones Main, Projector and Accent. Additionally, the engine 110 can specify that the devices in the zone Room 6-25 be further commissioned with a common functionality, e.g., a master power functionality. For example, an administrator would then be able to secure power to all devices in the entire room during troubleshooting or network maintenance. Other functional configurations could also be added, such as granular control for the entire room or particular zones that belong to the zone Room 6-25 (e.g., dim lights in "Room 6-25: Main"). Likewise, all of the devices belonging to the zones that are either direct or indirect children of the zone Floor 6 could be commissioned with a common functionality.

§3.1.2 Auto Labeling

A related attribute to zones is a label. Typically zones have names that convey functional or location meaning, e.g., zone "Accent" is a zone for accent light devices. Likewise, devices can also have names that convey functional or location meaning. Zone and device labeling, however, is usually done manually. For several zones and only a few dozen devices, manual labeling of devices is manageable. However, for a large building in which hundreds or even thousands of devices are being deployed, or when two or more segments are being merged, labeling becomes time intensive and prone to error.

In some implementations, the engine 110 automatically labels a device by either using its globally unique ID (IEEE address for instance), and/or by the device type (obtained through a discovery process). In some implementations, the engine can also or alternatively label a device by the zone to which it belongs and its associated functionality. For example, for the room illustrated in FIG. 3B, and from the consolidated zone data represented by FIG. 4, the engine 110 can process identifying information from the wireless device data and the consolidate zone data to generate labels with both functional and location meaning. An automatically generated label can be of the form <Zone Id(s)>:DeviceName, and thus the example labels of the devices in zone Room 6-25 can be:

Room 6-25:Main:Lamp #1
Room 6-25:Main:Lamp #2
. . .
Room 6-25:Accent:Light #3

In some implementations, the engine 110 can build an automatic label by including an entire zone hierarchy in a label name, and then sequentially numbering like devices in the same child node. For example, for the devices above, hierarchal labels can be:

Building:Floor 6:Room 6-25:Main:Lamp #1
Building:Floor 6:Room 6-25:Main:Lamp #2
. . .
Building:Floor 6:Room 6-25:Accent:Light #3

§3.1.3 Auto Locating

Like labeling, locating a device is likewise a tedious task, and becomes prone to error as the number of devices increases. As with auto-labeling, however, the engine 110 can perform an auto-locating process to locate devices on a plan hard copy. This can simplify commissioning and facilitate easy troubleshooting and device identification.

The engine 110 performs an auto locating process that combines received signal strength indications from devices with the consolidated zone data and physical environment data to determine the locations of devices on a zone-by-zone basis. As described above, deployments often involve the creation of zones that control devices within a small area, e.g., devices in a room are often located in zones that are confined to the room.

In some implementations, the RSSI can be used to generate location data that specifies the device locations and map the locations to the physical environment data 142. For example, for the meeting room described above, the devices in the zones can be located using RSSI calculations, and the location data can be compared to the consolidated zone configuration data. From this comparison, in-zone deployed wireless devices that are determined to be deployed at locations within the physical deployment areas of the respective consolidated zones to which they belong can be identified. Likewise, out-of-zone deployed wireless devices that are determined to be deployed at locations not within the physical deployment areas of the respective consolidated zones to which they belong can also be identified. For the latter devices, an alert list can be generated, and a technician can manually check the device locations and take any necessary remedial actions (e.g., re-zone a device or move the device to another location). Additionally, the location data can be used in conjunction with the consolidated zone configuration data and the physical environment data 142 to generate a graphical display similar to the block diagram of FIG. 3B.

In some implementations, determining the actual location of individual devices may not be required. Instead, the zone may be an atomic location unit. Provided the devices within the zones tend to be closely co-located (e.g., within meters of each other), the zone can serve as an accurate location unit. Using this alternative, the engine 110 verifies the locations of the zones themselves, rather than individual devices. Upon selection of a zone corresponding to a physical deployment area in floor plan, a list of devices belonging to the zone is generated. The devices can then be verified to be in the zone. For example, a technician can go to a room in which the zone is located and verify operation of the devices in the room using a commissioning tool or the engine 110 implemented in a laptop device. As the technician tests the devices (e.g., operates switches, etc., in the room), the engine 110 monitors for corresponding traffic to and from the devices in the zone being verified. If all the devices are successfully tested, the engine 110 verifies that the zone has been correctly located.

In zone-only location, in which the zone is an atomic location unit, zones are the primary handler for a device. Once zones are assigned devices, searches for the devices are handled based on zones. For example, if a device is detected to have failed (or, in acting as a router, it is being overloaded by packet traffic), alerts would be triggered on the basis of a zone (e.g., "A device in zone 'Room 6-25:Main' has failed").

Using zones as an atomic unit may be extended to other commissioning aspects. For example, instead of commissioning on a device level, commissioning can be implemented on a zone level. Thus, if a device has already been commissioned to be a member of a zone, but has not yet been properly configured (e.g., a thermostat in need of calibration), rather than alerting the installer that the device has not been commissioned, the engine 110 generates an alert that the zone has not been properly commissioned.

§3.1.4 Detecting Improperly Configured Devices and Improperly Configured Zones

The engine 110 can identify devices and/or zones that have not been properly configured. An improperly configured device is a device that has not been commissioned, or is in need of some other configuration action (e.g., in need of a calibration, a commissioned device that nevertheless fails to join the operating network, etc.). An improperly configured zone is a zone that includes one or more improperly configured devices, or is lacking one or more required zone configurations.

There are numerous situations for which the engine 110 will identify a device as being improperly configured. For example, a device that is not a member of a zone, and for which a unicast binding was not discovered where it is the destination for the binding and where one was expected, is likely to be incorrectly or incompletely configured; a device that does not have any bindings for which it sends its sensed information on, or for which no appropriate attribute reporting has been enabled to accomplish this task, is likely an incorrectly or incompletely configured device. Likewise, a zone that does not have any schedules assigned to it, nor any sensor devices assigned to the zone when sensors are required (e.g., a heating and air conditioning control system), is likely to be an incorrectly or incompletely configured zone. Where such an incorrectly or incompletely configured device is detected and it belongs to a zone, the zone itself may be identified as one that is incorrectly or incompletely configured.

§3.1.5 Configuration Back Up and Replacement

The engine 110 manages the storage of configuration data 140 to facilitate automated commissioning of replacement devices for failed devices. When the replacement devices joins the commissioning network, the engine 110 can commission the replacement device with the device label, bindings, zone membership(s), and other application-specific configuration data. The configuration data 140 is then populated with device specific data, such as the replacement device's IEEE address. The engine 110 can also track other data as well, such as failure rates for the device in that particular location, and the device type.

In some implementations, the engine 110 can provide for redundant storage of the configuration data 140. For example, the configuration data 140 can be stored in the server 220 and in the gateway controllers 204. Thus, in the event of a failure of the server 220 or a controller 204, the configuration data 140 can be recovered from another device. In another implementation, a backup copy of the configuration data 140 is stored on a remote server, e.g., server 240.

In some implementations, the configuration data is distributively stored. For example, device labels can be stored on the server 220 and pushed down to each gateway 204 for redundant storage. Likewise, consolidated zone data can be stored on the server 202, and zone specific data for a particular zone can be pushed to controllers or devices in the zone for redundant storage.

Additionally, in some implementations, configuration data 140 is hierarchically stored so that each device stores configuration data 140 specific to the device and all devices that it is related to in the consolidated zone hierarchy. For example, configuration data for all devices on a floor 202 is stored in a gateway controller 204 on that floor. Likewise, configuration data for all devices in a zone are stored in devices that belong to that zone. The particular storage option used for the configuration data 140 can be specified by a user.

§3.1.6 Re-Commissioning

While the examples above have been described in the context of commissioning, the systems and methods apply equally to re-commissioning, i.e., where an existing wireless network needs to be modified, such as in the case of a floor build-out or a new tenant, which may require changes to room structure, or re-arrangement of lighting zones, the zone structure may need to be changed and auto-labeling and detection of uncommissioned zones and devices may be useful.

§3.2 Example Zone Consolidation Process

Figure 5:
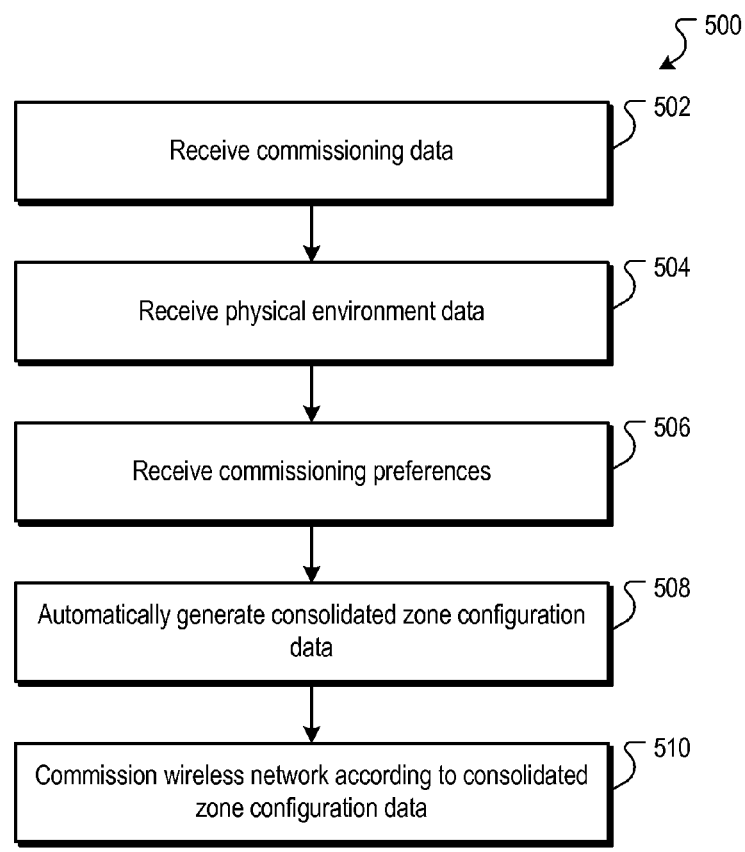
FIG. 5 is a flow diagram of an example process of commissioning a wireless network according to consolidated zone configuration data.

FIG. 5 is a flow diagram of an example process 500 of commissioning a wireless network according to consolidated zone configuration data. The process 500 can be implemented in the engine 110 of FIG. 1.

The process 500 receives commissioning data (502). For example, the engine 110 can receive a device list specifying a plurality of wireless devices to join or that have joined the wireless network, and zone configuration data specifying a plurality of zones in the wireless network and further specifying, for each zone, one or more devices of the plurality of wireless devices that belong to the zone. The data can be received from one of the commissioning processes 120 or 130.

The process 500 receives physical environment data (504). For example, the engine 110 can receive the physical environment data 142, which specifies building dimensions, rooms, and the like.

The process 500 receives commissioning preferences (506). For example, the engine 110 can receive the manual configuration data 146, which specifies various commissioning preferences, such as zone consolidation parameters, labeling parameter, etc.

The process 500 automatically generates consolidated zone configuration data (508). For example, the engine 110 automatically generates consolidated zone configuration data from the commissioning data, the physical environment data, and the configuration preferences. The consolidated zone configuration data specifies consolidated zones in the wireless network. Each of the consolidated zones correspond to one of the physical deployment areas, and specifies respective wireless devices that belong to the consolidated zone.

The process 500 commissions the wireless network according to the consolidated zone configuration data (510). For example, the engine 110, operating in conjunction with a commissioning tool, can commission the wireless network according to the consolidated zone configuration data.

§3.3 Optimization

Much of the information described above is used for commissioning and storage of configuration data. While this information can also be initially used for optimization, much of the optimization processes described below are triggered by events that are observed during the operational analysis process 150.

§3.3.1 Routing Optimization

Wireless embedded networking technologies such as ZigBee contain networking and routing capabilities. However, these capabilities tend to be based on local information, e.g., each router collects local information it can detect and makes the best routing decisions it can.

The engine 110 can process system-wide data to implement more optimal routing and configuration decisions. For example, the engine 110 can detect overloaded routers (routing bottlenecks), failures and faults, high levels of route discovery and route flapping (e.g., undesirably rapid changes in routes). Upon detecting one or more of these events, the engine 110 can perform one or more of a router pruning operation and a traffic steering operation. A router pruning operation disables the routing capability of routers to reduce router density. A traffic steering operation guides traffic routes by using source routing. Other routing optimization operations can also be performed.

§3.3.2 Channel Optimization

A particular wireless channel may undergo a degradation. The degradation can be due to, for example, a crowded wireless network, a low signal to noise ratio, and other factors. The engine 110 can monitor channel performance and initiate a change in channel frequency to minimize the performance degradation. Example processes for detecting conditions for initiating a change in frequency include scanning level monitoring and retransmission level monitoring.

Scanning level monitoring detects ambient noise levels across channels and detects long-term changes in network conditions. When a channel for a network segment undergoes a performance degradation, e.g., the ambient noise level is increased to an unacceptably high level, the engine can cause the wireless network to switch to another channel with an acceptable ambient noise level.

Retransmission level monitoring monitors for an increase in levels of retransmissions between devices. For example, if the engine 110 detects the number of retransmissions in a wireless network increases by a threshold amount, e.g., 20%, over a time period, then the engine 110 can cause the wireless network to switch to another channel.

In some implementations, the engine 110 switches frequencies to alternative channels at specified quiet hours to channels determined automatically based on channel scan.

The specified quiet hours can be predefined, e.g., from 2:00 AM-4:00 AM, or based on the tracking the history traffic activity by the engine 110.

§3.3.3 Segmentation Optimization

In a large system with hundreds to thousands of devices, a single wireless network containing all devices running on the same network and the same channel is unlikely to scale effectively and reliably. In some implementations, the engine 110 can cause a wireless network to be divided into two or more segments. For example, there may be too many devices on a single network channel, leading to congestion. Segmentation of a single wireless system into two or more segments, each segment with reduced number of devices than in the original un-segmented network, increases reliability and scalability. Each segment is controlled by separate gateways that communicate with the server 220 to provide overall coordination.

Figure 6:
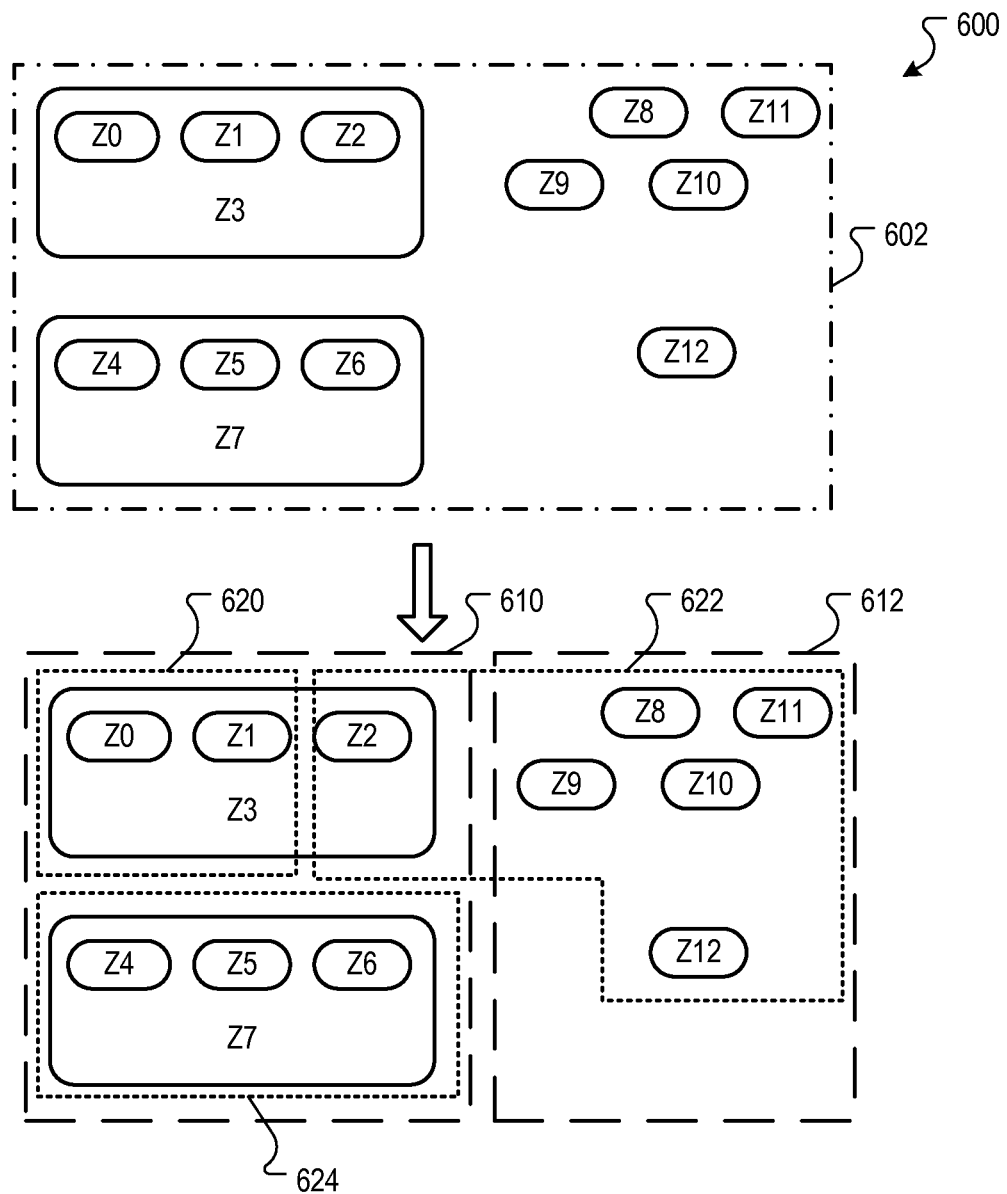
FIG. 6 is a block diagram illustrating the segmentation of wireless networks.

FIG. 6 is a block diagram illustrating the segmentation of a wireless network 600. As initially configured, the wireless network is a single segment. Perhaps, for example, the wireless network initially consisted of the devices in the zones Z0-Z2. Over time, however, additional devices and zones were added.

In response to observing a re-segmentation event in the wireless network 600, the engine can re-segment the network 600 into two or more segments. A re-segmentation event is an event that signals a wireless network performance degradation that can be resolved by re-segmenting the wireless network. Examples of re-segmentation events include a traffic level for a router wireless device exceeds a maximum traffic level threshold; a number of hops between two wireless devices in the wireless network segment exceeds a maximum hop threshold; and a wireless device being unable establish at least a minimum quality data communication with a threshold number of router wireless devices that belong to the consolidated zones in the segment.

What devices and zones belong to a segment can be determined by the engine automatically, or can be subject to conditions specified in the manual configuration data 146. For example, the network can be re-segmented across zones, as shown by the segments 620, 622, and 624, wherein the zone Z0 is divided between two segments. Alternatively, the segments can be zone restricted so that zones are not divided between segments, as indicated by the segments 610 and 612.

In some implementations, the engine 110 re-segments the network 600 by aggregate devices in relatively closely located zones into a segment. Such aggregation is more likely to result in effective radio coverage and prevents islands within that segment. In some implementations, the engine 110 ensures that all devices within a segment are within radio range of at least three routers within the segment.

In some implementations, the engine 110 can perform more complicated re-segmentations processes. For example, the engine 110 can iteratively re-segment the network 600 (e.g., during quiet hours) and monitor network performance after each re-segmenting operation. The engine 110 ceases to re-segment the network when the overall network performance is acceptable, i.e., no re-segmentation events are observed.

§3.3.4 Functional Optimization

A functional event is an event that signals a performance degradation in a segment and which can be resolved by modifying the functional relationships of devices in the segment. On detection of certain functional events, the engine 110 can reconfigure functions of devices in the wireless network. For example, bindings in a wireless network that conforms to the ZigBee standard can be revised to optimize traffic flow and other features of operational performance.

For example, if a lighting controller function (e.g., accepting sensor data and subsequently triggering certain lights to be dimmed or turned off) can be moved to several other device, and routing inefficiencies are detected for certain combinations of sensors, lights and controller functions, the engine 110 may move the controller function to another device that results in an increase in routing efficiency.

Similarly, a system may have been commissioned in which the sensors send sensed data to a gateway controller first and the gateway controller then sends commands to the lights. This may result in inefficient routing, leading to unacceptably high latency. The engine 110 can re-configure the sensor to send its commands directly to the light, and subsequently to the gateway controller for logging purposes.

The engine 110 can be programmed with routing algorithms specific to the particular network protocol to process different routing and functional configurations. After each reconfiguration, the engine 110 can monitor performance to determine if further functional optimization is required.

§3.4 Example Optimization Processes

Figure 7:
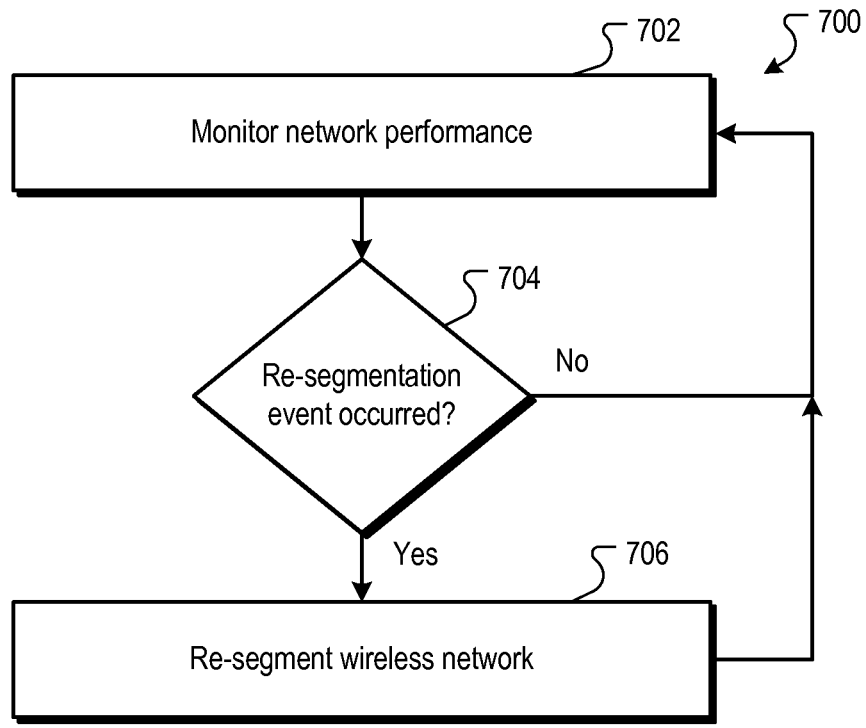
FIG. 7 is a flow diagram of an example process for triggering a resegmenting of a wireless network.

FIG. 7 is a flow diagram of an example process 700 for triggering a resegmenting of a wireless network. The process 700 can be implemented in the engine 110 of FIG. 1.

The process 700 monitors network performance (702). For example, the engine 110 can monitor for the occurrence of a re-segmentation event, as described above.

The process determines if a re-segmentation event has occurred (704). For example, the engine 110 can determine if any of the following events have occurred: traffic level for a router wireless device exceeding a maximum traffic level threshold; a number of hops between two wireless devices in the wireless network segment exceeding a maximum hop threshold; and a wireless device being unable establish at least a minimum quality data communication with a threshold number of router wireless devices that belong to the consolidated zones in the segment.

If the process determines that re-segmentation event has not occurred, then the process continues to monitor network performance (702). If, however, the process determines that re-segmentation event has occurred, then the process re-segments the wireless network (706). For example, the engine 110 can re-segment the wireless network into two or more segments so that no additional re-segmentation events are observed.

Figure 8:
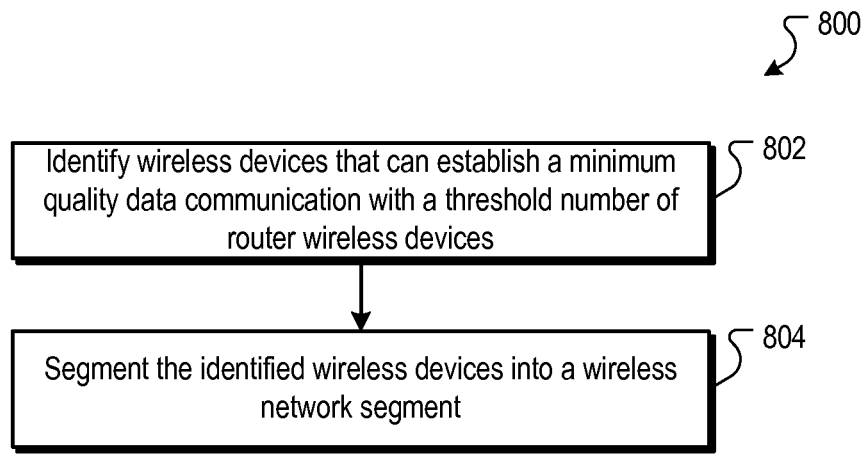
FIG. 8 is a flow diagram of an example process for resegmenting a wireless network.

FIG. 8 is a flow diagram of an example process 800 for resegmenting a wireless network. The process 800 can be implemented in the engine 110 of FIG. 1.

The process 800 identifies wireless devices that can establish a minimum quality data communication with a threshold number of wireless router devices (802). A minimum quality data communication is a data communication that does not experience system problems monitored by the operational analysis process 150. For example, if the minimum threshold number is three, then a device that is in data communication with only one wireless router is determined to not have established a minimum quality data communication with a threshold number of wireless router devices. Likewise, a device that meets a hop count requirement for only two wireless routers is also considered to not have established a minimum quality data communication with a threshold number of wireless router devices.

The process 800 segments the identified wireless devices into a wireless network segment (804). For example, once the engine 110 can find no additional devices that can establish a minimum quality data communication with a threshold number of wireless router devices in a network segment, or a maximum number of devices are reached, then the engine 110 segments the identified wireless devices into a network segment.

§4.0 Reporting and Alerts

The engine 110 can generate reports and alerts 166. In some implementations, reports summarize actions taken by the engine 110, and the alerts indicate actions that require human intervention. For example, reports related to failure trends, automatic re-segmenting, zone and device listings, etc., can be periodically generated. Alerts can be generated failed devices that need to be replaces, low battery indications, and the like. In some implementations, the engine 110 can generate detailed instructions (e.g., "Wizard-style" procedural steps) that can guide technicians in the actions required to respond to alerts.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a personal digital assistant (PDA), a mobile audio or video player, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can optionally be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 9:
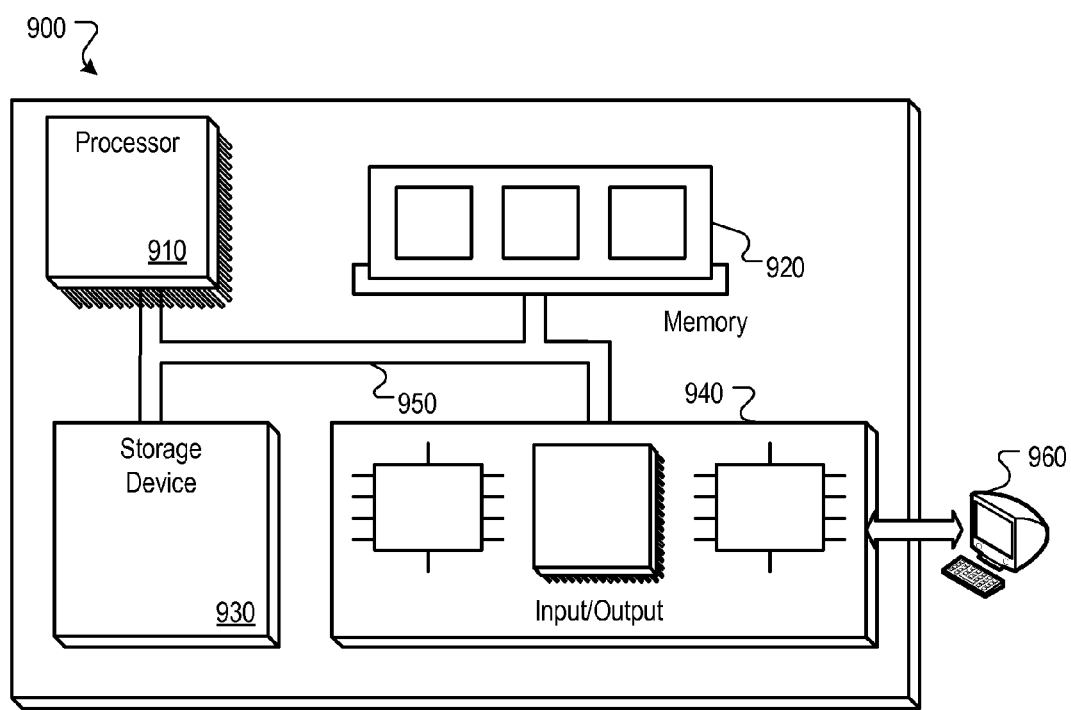
FIG. 9 is a block of a programmable processing system.

An example of a computer in which the above-described techniques can be implemented is shown in FIG. 9, which shows a block diagram of a programmable processing system (system). The system 900 can be utilized to implement the systems and methods described herein, i.e., the system 900 can implement the wireless network configuration and optimization engine 110 and the processes and functions of the engine 110 described above.

The system 900 includes a processor 910, a memory 920, a storage device 930, and an input/output device 940. Each of the components 910, 920, 930, and 940 can, for example, be interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can, for example, include a hard disk device, an optical disk device, or some other large capacity storage device.

The input/output device 940 provides input/output operations for the system 900. In one implementation, the input/output device 940 can include one or more of a wired network interface device, a serial communication interface device, and/or a wireless interface device. In another implementation, the input/output device can include driver devices configured to receive input data and send output data to other input/output devices, e.g., keyboard, printer and display devices 960.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus, the method comprising:
   receiving commissioning data for a wireless network, the commissioning data including:
   a device list specifying a plurality of wireless devices to join or that have joined the wireless network;
   zone configuration data specifying a plurality of zones in the wireless network and further specifying, for each zone, one or more devices of the plurality of wireless devices that belong to the zone; and
   receiving physical environment data defining a plurality of physical deployment areas in which the plurality of wireless devices are deployed;
   receiving configuration preferences for the wireless network and the physical environment data;
   automatically generating consolidated zone configuration data from the commissioning data, the physical environment data, and the configuration preferences, the consolidated zone configuration data specifying a plurality of consolidated zones in the wireless network, each of the consolidated zones:
   corresponding to one of the physical deployment areas;
   specifying respective one or more wireless devices that belong to the consolidated zone; and
   commissioning the wireless network according to the consolidated zone configuration data.

2. The method of claim 1, wherein:
   the physical environmental data define a physical deployment area hierarchy that includes physical deployment area parent nodes and physical deployment area child nodes, each of which represent one of the physical deployment areas; and
   the plurality of consolidated zones define a zone hierarchy, the zone hierarchy including parent area zone nodes and child area zone nodes, each of which represent at least one of the consolidated zones, and wherein each parent area zone node and child area zone node corresponds to one of the physical deployment area parent nodes or physical deployment area child nodes.

3. The method of claim 2, wherein at least one of the parent zone nodes or child zone nodes further specify only respective one or more wireless devices that are each to be commissioned with a common application functionality.

4. The method of claim 1, wherein the consolidated zone configuration data defines, for each consolidated zone, a unique zone name, and further comprising:
   automatically generating wireless device labeled data for each wireless device, the wireless device labeled data for each wireless device including the unique zone name of the optimize zone to which the wireless device belongs.

5. The method of claim 1, further comprising:
   receiving signal strength indication data specifying the received signal strengths of the plurality of wireless devices in wireless network;
   generating location data from the received signal strength indication data, the location data specifying the locations at which the wireless devices are deployed;
   comparing the location data to the consolidated zone configuration data;
   identifying, from the comparison, in-zone deployed wireless devices that are determined to be deployed at locations within the physical deployment areas of the respective consolidated zones to which they belong; and
   identifying, from the comparison, out-of-zone deployed wireless devices that are determined to be deployed at locations not within the physical deployment areas of the respective consolidated zones to which they belong.

6. The method of claim 1, wherein the commissioning data includes configuration data for each of the plurality wireless devices, the configuration data specifying, for each of the wireless devices, a current configuration of the wireless device, and further comprising:
   determining if each of the wireless devices is properly configured; and
   in response to determining a wireless device is not properly configured, identifying the wireless devices as an incompletely configured wireless device.

7. The method of claim 6, wherein determining if each of the wireless devices is properly configured comprises determining, for each wireless device, whether the wireless device belongs to a consolidated zone, and determining that the wireless device is not properly configured if the wireless device does not belong to a consolidated zone.

8. The method of claim 6, wherein determining if each of the wireless devices is properly configured comprises determining, for each wireless device, whether the wireless device has an associated binding for sending data, and determining that the wireless device is not properly configured if the wireless device does not have the associated binding for sending data.

9. The method of claim 1, wherein the commission data includes configuration data for each of the plurality wireless devices, the configuration data specifying, for each of the wireless devices, a current configuration of the wireless device, and further comprising:
   for each consolidated zone, determining if each of the wireless devices belonging to the consolidated zone are properly configured; and
   in response to determining that one or more of the wireless devices belonging to the consolidated zone is not properly configured, identifying the consolidated zone as an incompletely configured consolidated zone.

10. The method of claim 1, further comprising:
    storing in a data store, for each wireless device, wireless device settings data, the wireless device settings data specifying the consolidated zone to which the wireless device belongs, and configuration data specifying a current configuration of the wireless device;
    identifying a replacement wireless device for a first wireless device that currently belongs to a consolidated zone; and
    automatically configuring the replacement wireless device with the wireless device settings data of the first wireless device.

11. The method of claim 1, further comprising segmenting the wireless network, the segmenting comprising:
    identifying wireless devices that belong to the consolidated zones and that can establish at least a minimum quality data communication with a threshold number of router wireless devices that belong to the consolidated zones; and
    segmenting the identified wireless devices into a wireless network segment.

12. The method of claim 1, further comprising:
    determining that a re-segmentation event in the wireless network has occurred; and
    automatically re-segmenting the wireless network in response to the determination that the re-segmentation event occurred in the wireless network;
    wherein determining that a re-segmentation event in the wireless network has occurred comprises determining that one or more of the following conditions have occurred:
    a traffic level for a router wireless device exceeds a maximum traffic level threshold;
    a number of hops between two wireless devices in the wireless network segment exceeds a maximum hop threshold; and
    a wireless device cannot establish at least a minimum quality data communication with the threshold number of router wireless devices that belong to the consolidated zones in the wireless segment.

13. The method of claim 1, wherein each consolidated zone further represents a logical grouping of wireless devices that facilitates control the devices as a single entity.

14. The method of claim 1, wherein the wireless devices belonging to an consolidated zone are associated with a unicast address that is unique for the consolidated zone.

15. The method of claim 1, wherein the wireless devices belonging to an consolidated zone are associated with a unicast address that is not unique for the consolidated zone.

16. A system, comprising:
    a data processing apparatus; and
    a computer storage medium encoded with a computer program, the program comprising instructions that when executed by the data processing apparatus cause the data processing apparatus to perform operations comprising:
    receiving commissioning data for a wireless network, the commissioning data including:
    a device list specifying a plurality of wireless devices to join or that have joined the wireless network;
    zone configuration data specifying a plurality of zones in the wireless network and further specifying, for each zone, one or more devices of the plurality of wireless devices that belong to the zone; and receiving physical environment data defining a plurality of physical deployment areas in which the plurality of wireless devices are deployed;

receiving configuration preferences for the wireless network and the physical environment data;

automatically generating consolidated zone configuration data from the commissioning data, the physical environment data, and the configuration preferences, the consolidated zone configuration data specifying a plurality of consolidated zones in the wireless network, each of the consolidated zones:
- corresponding to one of the physical deployment areas;
- specifying respective one or more wireless devices that belong to the consolidated zone; and commissioning the wireless network according to the consolidated zone configuration data.

17. The system of claim 16, wherein:
the physical environmental data define a physical deployment area hierarchy that includes physical deployment area parent nodes and physical deployment area child nodes, each of which represent one of the physical deployment areas; and
the plurality of consolidated zones define a zone hierarchy, the zone hierarchy including parent area zone nodes and child area zone nodes, each of which represent one of the consolidated zones, and wherein each parent area zone node and child area zone node corresponds to one of the physical deployment area parent nodes or physical deployment area child nodes.

18. The system of claim 17, wherein at least one of the parent zone nodes or child zone nodes further specify only respective one or more wireless devices that are each to be commissioned with a common application functionality.

19. The system of claim 16, wherein the consolidated zone configuration data defines, for each consolidated zone, a unique zone name, and the program instructions further cause the data processing apparatus to perform operations comprising:
automatically generating wireless device labeled data for each wireless device, the wireless device labeled data for each wireless device including the unique zone name of the optimize zone to which the wireless device belongs.

20. The system of claim 16, wherein the program instructions further cause the data processing apparatus to perform operations comprising:
receiving signal strength indication data specifying the received signal strengths of the plurality of wireless devices in wireless network;
generating location data from the received signal strength indication data, the location data specifying the locations at which the wireless devices are deployed;
comparing the location data to the consolidated zone configuration data;
identifying, from the comparison, in-zone deployed wireless devices that are determined to be deployed at locations within the physical deployment areas of the respective consolidated zones to which they belong; and
identifying, from the comparison, out-of-zone deployed wireless devices that are determined to be deployed at locations not within the physical deployment areas of the respective consolidated zones to which they belong.

21. The system of claim 16, wherein the commissioning data includes configuration data for each of the plurality wireless devices, the configuration data specifying, for each of the wireless devices, a current configuration of the wireless device, and the program instructions further cause the data processing apparatus to perform operations comprising:

determining if each of the wireless devices is properly configured; and
in response to determining a wireless device is not properly configured, identifying the wireless devices as an incompletely configured wireless device.

22. The system of claim 21, wherein determining if each of the wireless devices is properly configured comprises determining, for each wireless device, whether the wireless device belongs to a consolidated zone, and determining that the wireless device is not properly configured if the wireless device does not belong to a consolidated zone.

23. The system of claim 21, wherein determining if each of the wireless devices is properly configured comprises determining, for each wireless device, whether the wireless device has an associated binding for sending data, and determining that the wireless device is not properly configured if the wireless device does not have the associated binding for sending data.

24. The system of claim 16, wherein the commission data includes configuration data for each of the plurality wireless devices, the configuration data specifying, for each of the wireless devices, a current configuration of the wireless device, and the program instructions further cause the data processing apparatus to perform operations comprising:
for each consolidated zone, determining if each of the wireless devices belonging to the consolidated zone are properly configured; and
in response to determining that one or more of the wireless devices belonging to the consolidated zone is not properly configured, identifying the consolidated zone as an incompletely configured consolidated zone.

25. The system of claim 16, wherein the program instructions further cause the data processing apparatus to perform operations comprising:
storing in a data store, for each wireless device, wireless device settings data, the wireless device settings data specifying the consolidated zone to which the wireless device belongs, and configuration data specifying a current configuration of the wireless device;
identifying a replacement wireless device for a first wireless device that currently belongs to a consolidated zone; and
automatically configuring the replacement wireless device with the wireless device settings data of the first wireless device.

26. The system of claim 16, wherein the program instructions further cause the data processing apparatus to perform operations comprising segmenting the wireless network by:
identifying a set of candidate consolidated zones;
identifying wireless devices that belong to the consolidated zones in the set of candidate consolidated zones that can establish at least a minimum quality data communication with a threshold number of router wireless devices that belong to the consolidated zones in the set of candidate consolidated zones;
segmenting the identified wireless devices into a wireless network segment.

27. The system of claim 26, wherein segmenting the wireless network comprises:
determining that a re-segmentation event in the wireless network has occurred; and
automatically re-segmenting the wireless network in response to the determination that the re-segmentation event occurred in the wireless network;

wherein determining that a re-segmentation event in the wireless network has occurred comprises determining that one or more of the following conditions have occurred:
- a traffic level for a router wireless device exceeds a maximum traffic level threshold;
- a number of hops between two wireless devices in the wireless network segment exceeds a maximum hop threshold; and
- a wireless device cannot establish at least a minimum quality data communication with the threshold number of router wireless devices that belong to the consolidated zones in the wireless segment.

28. The system of claim 16, wherein each consolidated zone further represents a logical grouping of wireless devices that facilitates control the devices as a single entity.

29. The system of claim 16, wherein the wireless devices belonging to an consolidated zone are associated with a unicast address that is unique for the consolidated zone.

* * * * *

UNITED STATES PATENT AND TRADEMARK OFFICE
CERTIFICATE OF CORRECTION

PATENT NO.         : 8,503,330 B1                                    Page 1 of 1
APPLICATION NO.    : 12/718204
DATED              : August 6, 2013
INVENTOR(S)        : Jason Yew Choo Choong It is certified that error appears in the above-identified patent and that said Letters Patent is hereby corrected as shown below:

Title Page, Item (57) Line 7, Column 2 (Abstract), delete "on" and insert -- one --, therefor.

Signed and Sealed this
Eleventh Day of February, 2014

Michelle K. Lee
*Deputy Director of the United States Patent and Trademark Office*